(12) United States Patent
Borrelli et al.

(10) Patent No.: US 7,817,340 B2
(45) Date of Patent: Oct. 19, 2010

(54) ULTRA-THIN GLASS POLARIZERS AND METHOD OF MAKING SAME

(75) Inventors: Nicholas F. Borrelli, Elmira, NY (US); David G. Grossman, Corning, NY (US); Larry G. Mann, Painted Post, NY (US); Jeanne M. Mordarski, Albuquerque, NM (US)

(73) Assignee: Corning Incorporated, Corning, NY (US)

( * ) Notice: Subject to any disclaimer, the term of this patent is extended or adjusted under 35 U.S.C. 154(b) by 351 days.

(21) Appl. No.: 10/971,314

(22) Filed: Oct. 22, 2004

(65) Prior Publication Data

US 2005/0128588 A1 Jun. 16, 2005

Related U.S. Application Data

(62) Division of application No. 09/674,115, filed as application No. PCT/US99/07521 on Apr. 6, 1999, now Pat. No. 6,912,087.

(60) Provisional application No. 60/085,464, filed on May 14, 1998.

(51) Int. Cl.
*G02B 5/30* (2006.01)
(52) U.S. Cl. .................. 359/492; 252/585; 501/11
(58) Field of Classification Search .............. 359/352, 359/490, 492; 252/585; 501/11
See application file for complete search history.

(56) References Cited

U.S. PATENT DOCUMENTS

| | | | | |
|---|---|---|---|---|
| 4,304,584 A | | 12/1981 | Borrelli et al. | |
| 4,479,819 A | * | 10/1984 | Borelli et al. | 65/30.11 |
| 4,486,213 A | * | 12/1984 | Lentz et al. | 65/30.11 |
| 4,908,054 A | * | 3/1990 | Jones et al. | 65/30.11 |
| 5,840,096 A | * | 11/1998 | Tajima et al. | 75/334 |
| 5,864,427 A | * | 1/1999 | Fukano et al. | 359/492 |
| 5,886,820 A | * | 3/1999 | Tajima et al. | 359/492 |
| 5,943,156 A | * | 8/1999 | Komuro et al. | 359/280 |
| 5,999,315 A | * | 12/1999 | Fukano et al. | 359/492 |
| 6,171,762 B1 | | 1/2001 | Borrelli et al. | |
| 6,221,480 B1 | * | 4/2001 | Borrelli et al. | 428/325 |
| 6,251,297 B1 | * | 6/2001 | Komuro et al. | 216/24 |
| 6,313,947 B1 | * | 11/2001 | Takahashi et al. | 359/492 |
| 6,535,655 B1 | * | 3/2003 | Hasui et al. | 385/11 |
| 6,563,639 B1 | * | 5/2003 | Borrelli et al. | 359/486 |
| 6,761,045 B2 | * | 7/2004 | Hasui | 65/30.1 |

(Continued)

FOREIGN PATENT DOCUMENTS

EP 0105701 4/1984

(Continued)

OTHER PUBLICATIONS

Merriam-Webster's Collegiate Dictionary, Tenth Edition, Copyright 1999, by Merriam-Webster, Incorporated, p. 65.*

(Continued)

*Primary Examiner*—Ricky D Shafer
(74) *Attorney, Agent, or Firm*—Walter M. Douglas

(57) ABSTRACT

An ultra-thin polarizing glass article having two polarizing glass layers separated by a non-polarizing central region. The polarizing glass layers contain stretched or elongated metal particles and the non-polarizing central region contains elongated or stretched metal halide particle. The polarizing article has a thickness less than 200 micrometers.

4 Claims, 2 Drawing Sheets

U.S. PATENT DOCUMENTS 6,887,808 B2 * 5/2005 Hasui .......................... 501/13
6,912,087 B1 * 6/2005 Borrelli et al. .............. 359/492
7,104,090 B2 * 9/2006 Borrelli et al. ............... 65/32.1

FOREIGN PATENT DOCUMENTS

| EP | 0719741 A1 | 3/1996 |
|---|---|---|
| JP | 59-83951 | 5/1984 |
| JP | 8-231241 | 9/1996 |

OTHER PUBLICATIONS

"Selective Polarization of Light Due to Absorption by Small Elongated Silver Particles in Glass," S. D. Stookey, Applied Optics, vol. , No. 5, May 1968.

"Submicrometer-Thick Optical Polarizing Films with high Extinction Ration Using Stacked Silver Island Films," K. Yamaki, et al, Electronics and Communication in Japan, Part 2, vol. 82, No. 6, 1999.

* cited by examiner

ULTRA-THIN GLASS POLARIZERS AND METHOD OF MAKING SAME

PRIORITY AND CROSS-REFERENCE

The present application is a Divisional Application claiming the priority of U.S. Ser. No. 09/674,115 filed on Oct. 24, 2000 now U.S. Pat. No. 6,912,087 entitled "Ultra Thin Glass Polarizers and Method of Making", which in turn is a U.S. National Application based on and claiming the priority of PCT International Application No. PCT/US99/07521 filed Apr. 6, 1999 and titled "Ultra Thin Glass Polarizers and Method of Making"; which in turn claims the priority of U.S. Provisional Application No. 60/085,464 filed May 14, 1998 and titled "Ultra Thin Glass Polarizers and Method of Making".

FIELD OF THE INVENTION

The invention relates to ultra-thin light polarizing glass articles and a method for making same. In particular, it relates to a novel method for making silver-containing polarizing glass, and ultra-thin polarizing glass articles made from such glass. Specifically, the invention relates to a single layer light polarizing device free of adjacent non-polarizing regions.

BACKGROUND OF THE INVENTION

The use of very thin polarizing devices makes it possible to produce optical components without the need for expensive lens elements and more importantly, lessen alignment problems in order to maintain high light throughput. For any integrated device, the goal is to shorten the optical pathlength in order to decrease diffraction losses. These, and other aspects of vertical integration technology, as it is known, are described by Shiraishi et al., in *Vertical Integration Technology for Fiber-Optic Circuit*, OPTOELECTRONICS, Vol. 10, No. 1, pp. 55-74, March 1995.

The closest product of which we are aware, for producing optical isolators of the kind described herein is POLARCOR™, a high quality finished optical component available from Corning Incorporated, Corning, N.Y. This product is available in planar shapes with dimension up to 30 mm parallel to the major principal transmission direction.

POLARCOR™ products are also available in thickness as low as 0.2 mm.

In addition to POLARCOR™, we are aware of a several patents such as U.S. Pat. Nos. 5,430,573; 5,322,819; 5,300,465; 5,281,562; 5,275,979; 5,045,509; 4,792,535; 4,479,819; JP 4-279337; JP 5-208844; and EP 0 719 741 all of which have described glass articles which are polarizing in the infrared region.

JP 4-279337; JP 5-208844 describe a copper-based polarizing glass which, according to the patent application can measure less than 240μ in thickness. However, the examples were limited to glass thickness in the range of 100 to 1000μ, The polarizing glass of this patent application was prepared by polishing stretched copper halide-containing glass to a thickness in the range of 100 to 1000μ, and then subjecting the glass to a hydrogen atmosphere to form polarizing glass.

One disadvantage of the methods described in the above references, at least with respect to making ultra-thin polarizing glass, is the difficulty of handling and processing very thin free-standing glass pieces as required in the instant invention. In this connection, JP[Hei]9-86956 suggests a method for reducing loss due to the high stress used for stretching small crystals embedded in a glass matrix. However, there continues to be a need for improvements in the processes for making thin glass polarizers.

Accordingly, it is the object of the present invention to provide approaches for making ultra-thin polarizing glass articles in which the above difficulties are reduced or eliminated.

SUMMARY OF THE INVENTION

The invention relates to an ultra-thin polarizing glass, unique in that the glass is monolithic and has dispersed across its entire breadth and thickness, elongated submicroscopic metal particles. The metal particles have a long axis such that the glass preferentially absorbs polarizing components of light that is parallel to the long axis to allow high transmittance of light, which vibrates perpendicular to the long axis. The polarizing glass is also unique in that it is essentially free of metal halide particles which tend to impart certain undesirable optical properties to the glass such as photochromic properties, or light scattering caused by the presence of tiny halide crystals embedded in the glass. In another aspect, the invention relates to a method of making ultra-thin polarizing glass.

DETAILED DESCRIPTION OF THE INVENTION

In order to produce polarizing glass articles of the invention measuring less than 200μ thickness, we have developed a process by which polarizing glass can be thinned down to form an ultra-thin polarizing glass measuring even less than 50μ in thickness, preferably having a thickness in the range of 10 to 40μ.

Figure 1:
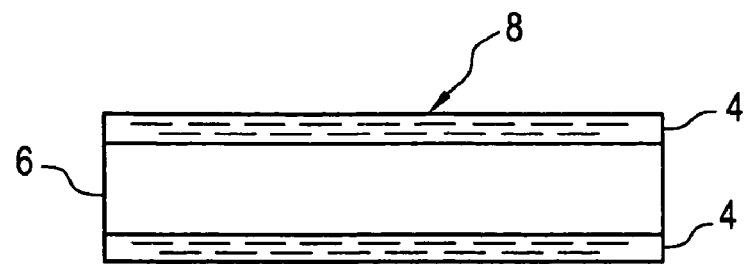
FIG. 1 is a schematic diagram of a POLARCOR™ glass which can be used to produce ultra-thin polarizing glass.
Figure 2:
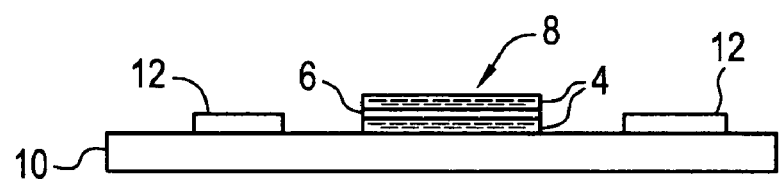
FIG. 2 is a schematic diagram of one embodiment of the inventive method of producing ultra-thin polarizing glass.

In one particularly useful embodiment, the process begins with a piece of POLARCOR™ glass 8 (FIG. 1), having two polarizing glass layers 4, separated by a non-polarizing region 6. The polarizing layers 4 of the glass contain stretched or elongated metal particles, while the non-polarizing central region contains elongated or stretched metal halide particles. In this embodiment (FIG. 2), to form very thin polarizing glass articles from the POLARCOR™ glass, the glass 8 is first blocked or bonded to a suitable substrate 10 using an appropriate material such as a resin, wax, or a resin/wax mixture. The glass is bonded onto the substrate such that one of the polarizing layers 4 is in abutting contact with the substrate 10. Two cover slips 12 are then placed on either sides of the glass as shown in FIG. 2. The slips, which are optional, serve to protect the edges of the POLARCOR™ glass during the lapping process.

Other appropriate blocking (bonding) compounds can also be used such as Loctite 412, a cyanoacrylate adhesive available from Locktite Corporation, Rocky Hill, Conn. After bonding the glass to the substrate, the top polarizing layer and the central non-polarizing region are removed, for example, by a single-side lapping process, optionally followed by a polish with a cerium oxide slurry. Then, while the bottom polarizing layer is still bonded to the substrate, the glass is diced (sliced) to obtain thin wafers of polarizing glass having the desired thickness. This dicing step can be done using a high speed precision wafer saw. Optionally, the wafers are further cut or diced to various lengths to obtain desired dimensions. The wafers are then separated and removed from the substrate by dissolving the blocking compound in a suitable solvent such as acetone, optionally finished by polishing, and then cleaned. The step of removing the top polarizing layer and the central non-polarizing layer can also be done by single-side lapping, chemical thinning, or by a combination of the single-side lapping followed by chemical thinning. Examples of useful chemical thinning techniques include use of suitable chemicals such as acid fluorides or molten sodium hydroxide baths. Using this technique 1 mm×2 mm wafers having a thickness in the range of 1 to 200μ (preferably less than 100μ) can be obtained.

Figure 3:
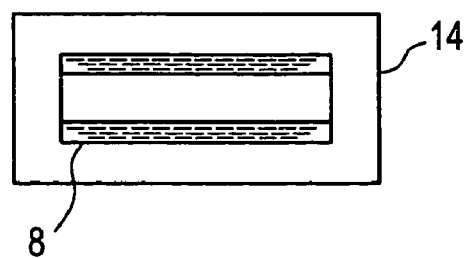
FIG. 3 is a schematic diagram illustrating another embodiment of the inventive method of producing ultra-thin polarizing glass.

In another embodiment (FIG. 3), the POLARCOR™ glass 8 to be thinned is encased in an appropriate medium 14 such as an outer skin glass of the type described in U.S. Pat. No. 4,486,213. In this embodiment, while still encased in the skin glass or other appropriate medium, thin wafers of polarizing glass are then sliced from the two polarizing layers as described above. The advantage of this approach is that the outer skin glass provides additional bulk and stiffness to the piece for ease of handling during the thinning process. The outer skin glass is subsequently removed by any suitable method such as by chemical dissolution.

In another embodiment, glass containing elongated metal halide particles, preferably silver halide particles, is thinned to a desired thickness, preferably in the range of 10 to 50μ using any of the above dicing and thinning techniques. After dicing and thinning to a desired thickness, the glass is subjected to a reducing gas environment as disclosed in U.S. Pat. Nos. 4,479,819 and 4,908,054, to convert all the silver halide particles to elongated metallic silver particles and to thereby render the glass polarizing.

Figure 4:
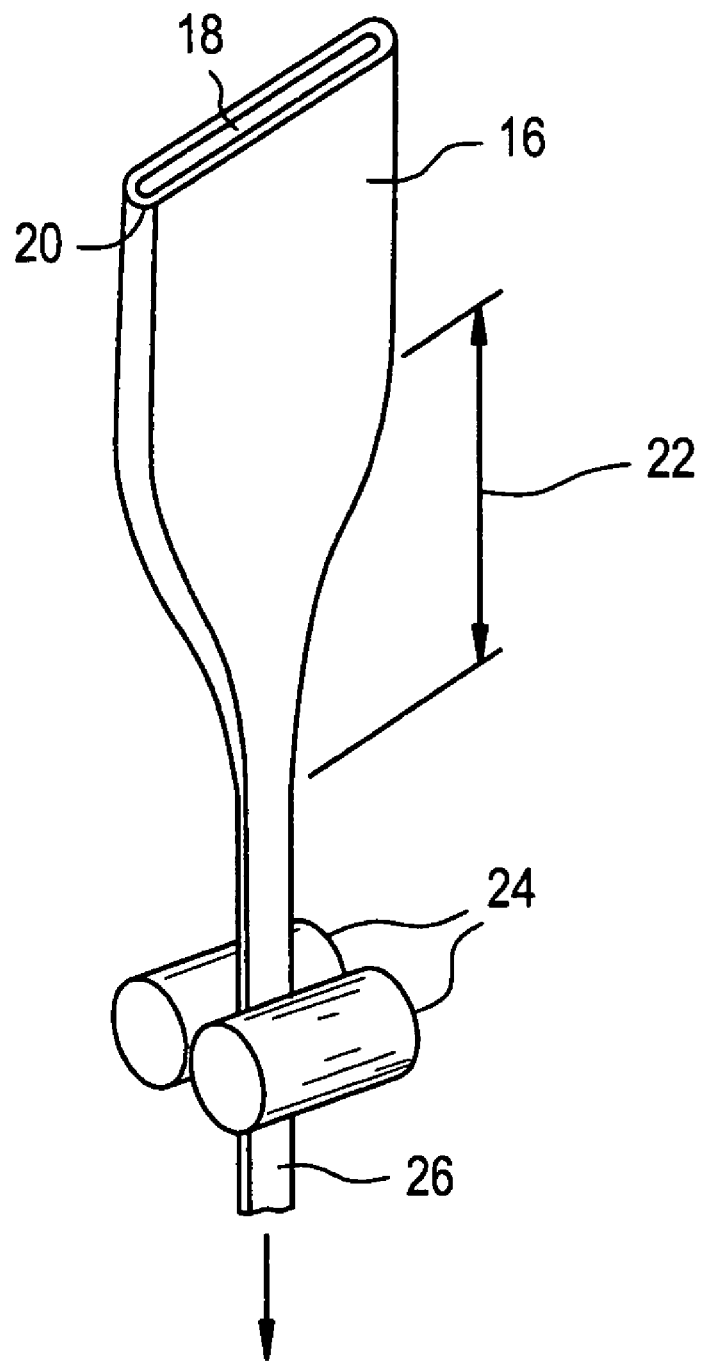
FIG. 4 is a schematic diagram illustrating an embodiment in which metal halide containing glass is processed while encased in an outer skin glass.

In still another embodiment, metal halide-containing glass is first encased in an appropriate medium to form a composite structure. The medium is preferably any gas permeable material which will not react with the glass. A particularly useful example of such a medium is the outer skin glass described in U.S. Pat. No. 4,486,213. The composite structure (i.e., skin glass and metal halide-containing glass) is then co-stretched to form a thin metal halide-containing glass in which the metal halide particles are elongated to a desired aspect ratio, for example, as described in the U.S. Pat. No. 4,486,213 (herein incorporated by reference). FIG. 4 illustrates one practical method of stretching the metal halide particles. As shown in FIG. 4, the composite structure 16 is shown comprising the metal halide containing glass 18 and a skin glass 20. The composite structure 16 passes through a hot zone of a redraw furnace represented by arrow 22, wherein the composite structure is heated and stretched under tension by pulling rolls 24 to form a stretched composite structure 26.

The stretched structure is then exposed to a reducing gas atmosphere to reduce the elongated metal halide particles and thereby form glass containing elongated metal particles. The structure can then be sliced as described herein to form very thin slices of polarizing glass 8 encased in skin glass. The skin glass can be removed by any appropriate method to expose the stretched polarizing glass. For example, the skin glass can be washed away using a suitable solvent.

In this embodiment, the metal halide containing glass can be encased in the skin glass either after it has been formed and hardened, or in molten form while both the skin glass and the metal halide containing glass are being discharged from a separate glass feeders such as described in U.S. Pat. No. 3,582,306, or laminated glass sheet formers as described in U.S. Pat. Nos. 4,204,027 and 4,214,886.

In still a further embodiment, metal halide-containing glass is first stretched to form elongated metal-halide particles having desired aspect ratios prior to encasement in a skin glass. After encasement, the structure is then exposed to a reducing gas environment to reduce the metal halide particles and form polarizing glass containing elongated metal particles. After the reducing step the glass containing elongated metal particles can then be thinned into desired a thickness using methods described herein.

The glass polarizing articles contains elongated metallic silver particles and said article exhibits an extinction ratio greater that 10 dB in a wavelength greater than 0.45 μm, and said glass is free of silver halide particles.

Further, the glass has a thickness of less than 200 μm.

Additionally, the polarizing glass article consists essentially of metallic silver particles having a long axis and the particles preferentially absorb polarizing component of light that is parallel to the long axis to allow high transmittance of light which vibrates perpendicular to the long axis.

In one embodiment the polarizing glass article has a thickness in the range of 5 to 100 μm.

EXAMPLES

The following example describes one preferred method for making polarizing glass having a thickness less than 100μ, preferably, less than 50μ, and most preferably, in the range of 10 to 40μ. The POLARCOR™ glass article used in the following example can be either a two-layer (a polarizing and a non-polarizing layer) or three-layer glass (a polarizing layer sandwiched between two non-polarizing layers).

1) measure and record the thickness of a glass slide and a POLARCOR™ piece using a metric micrometer;
2) place the glass slide, POLARCOR™ piece, and cover slips on a hot plate pre-set at a low temperature to allow the pieces to warm up;
3) smear some thermal set "rosin" on the glass slide and allow the rosin to melt; when melted, place the glass piece of POLARCOR™ on the rosin, place a cover slip on each side of the piece (Figure), and remove the slide from the hot plate to allow the glass to cool; and
4) measure the thickness of the glass slide and POLARCOR™ piece together, and subtract from this the initial thickness of the glass slide and POLARCOR™, to obtain the thickness of the rosin (smear) in order to determine the thickness of the POLARCOR™ during the thinning process;
5) after the slide has cooled sufficiently for further processing, place the slide on a thinning apparatus such as a Buehler Petro-thin unit (available from Buehler, Ltd., Lake Bluff, Ill.), and remove by grinding for example, the top portions of the POLARCOR™ piece until about 100 micron thickness is remaining;
6) remove the slide from the unit and measure the thickness of the slide and POLARCOR™ piece using a micrometer; from this number subtract the thickness of the slide and the thickness of the rosin later to obtain the amount of POLARCOR™ material remaining;
7) grind down the POLARCOR™ to remove enough of the top portions of the piece to obtain a very thin piece of material measuring about 20-50μ. The grind and measure steps are repeated until the desired thickness is obtained.

8) Polish to obtain an ultra-thin polarizing glass piece. Any known polishing medium can be used for this process such as a cerium oxide polishing wheel.

In other experiments, using the methods described above, we have produced several batches of polarizing glass articles having a mean thickness as low as 10μ after polishing.

To evaluate the optical performance of the glass polarizers of the invention, several samples 15×15 mm square, having thicknesses in the range of 27 to 34μ as measured with an optical microscope, were tested by measuring the transmission and contrast ratio of the wafers. With the wafers still mounted on the substrate, measured transmission was about 90%, while contrast ratio was in the range of 3124 to 3514, at a wavelength of 1510-1590 nm. Extinction ratios measured for these samples ranged between 29 and 31 dB.

As contemplated herein, the grinding step can be accomplished in one step, or in a series of steps. For example, an initial grinding step can be done using a 1200 grit grinding wheel in order to reduce the thickness to within a first approximation of the desired thickness, followed by a second grinding step using a 2400 grit grinding wheel to obtain the final desired thickness to within the actual specifications.

In the above illustration, it will be observed that one of the original surfaces of the POLARCOR™ piece, the side that is in contact with the slide, has been preserved throughout the entire grinding process. The final step in producing an ultra-thin polarizing glass is to disengage the polarizing glass piece from the slide using any known process. We have found the use of a solvent (e.g., methylene chloride) in and ultrasonic bath to be particularly useful for this purpose.

It should be understood that the foregoing represents illustrative embodiments of the invention, and is not intended to embody all aspects of the invention. In addition to the above embodiments, it will be clear to persons skilled in the art that numerous modifications and changes can be made to the illustrative embodiments without departing from the intended spirit and scope of the invention.

The invention claimed is:

1. A polarizing glass article consisting of a single glass layer with a total thickness of less than 100 μm and said glass layer containing elongated metallic silver particles across its entire breadth and thickness,
    wherein said polarizing glass article exhibits an extinction ratio greater than 10 dB in a wavelength greater than 0.45 μm.

2. The polarizing glass article according to claim 1, wherein said article has a thickness of less then 50 μm.

3. The polarizing glass article according to claim 1, wherein said article has a thickness in the range of 10-40 μm.

4. The polarizing glass article according to claim 1, wherein said glass article is essentially free of metal halide particles.

* * * * *